US007069343B2

(12) United States Patent
Goringe et al.

(10) Patent No.: US 7,069,343 B2
(45) Date of Patent: Jun. 27, 2006

(54) TOPOLOGY DISCOVERY BY PARTITIONING MULTIPLE DISCOVERY TECHNIQUES

(75) Inventors: Christopher M. Goringe, Seven Hills (AU); Muneyb Minhazuddin, Quakers Hill (AU); James D. Schreuder, Summer Hill (AU); Alex M. Krumm-Heller, Gladesville (AU)

(73) Assignee: Avaya TechnologyCorp., Basking Ridge, NJ (US)

( * ) Notice: Subject to any disclaimer, the term of this patent is extended or adjusted under 35 U.S.C. 154(b) by 602 days.

(21) Appl. No.: 10/127,888

(22) Filed: Apr. 22, 2002

(65) Prior Publication Data

US 2003/0046427 A1 Mar. 6, 2003

Related U.S. Application Data

(60) Provisional application No. 60/347,050, filed on Jan. 8, 2002, provisional application No. 60/317,719, filed on Sep. 6, 2001.

(51) Int. Cl.
*G06F 15/16* (2006.01)
(52) U.S. Cl. ........................ 709/249; 709/220; 709/248
(58) Field of Classification Search ................ 709/224, 709/238, 239, 240, 241, 242, 217, 218, 220, 709/228, 249; 370/285, 401
See application file for complete search history.

(56) References Cited

U.S. PATENT DOCUMENTS

| 4,556,972 | A | * | 12/1985 | Chan et al. ................. 370/354 |
|---|---|---|---|---|
| 4,644,532 | A | | 2/1987 | George et al. ................. 370/94 |
| 5,136,690 | A | | 8/1992 | Becker et al. ............... 395/161 |
| 5,185,860 | A | | 2/1993 | Wu |
| 5,226,120 | A | | 7/1993 | Brown et al. ................ 395/200 |
| 5,450,408 | A | | 9/1995 | Phaal ........................ 370/85.13 |
| 5,557,745 | A | | 9/1996 | Perlman et al. ......... 395/200.02 |
| 5,564,048 | A | | 10/1996 | Eick et al. ................... 395/600 |
| 5,572,650 | A | | 11/1996 | Antis et al. ................. 395/356 |
| 5,581,797 | A | | 12/1996 | Baker et al. ................. 395/326 |
| 5,596,703 | A | | 1/1997 | Eick et al. ................... 395/326 |
| 5,623,590 | A | | 4/1997 | Becker et al. ............... 395/326 |

(Continued)

FOREIGN PATENT DOCUMENTS

EP 0 455 402 A1 11/1991

OTHER PUBLICATIONS

U.S. Appl. No. 10/127,938, filed Apr. 22, 2002, Goringe et al.

(Continued)

*Primary Examiner*—Ario Etienne
*Assistant Examiner*—Sargon Nano
(74) *Attorney, Agent, or Firm*—Sheridan Ross P.C.

(57) ABSTRACT

A system for discovering a topology of a distributed processing network that includes a first topology discovery agent 308 configured to contact a first set of routers to obtain a first type of information stored in each router in the first set of routers; a second topology discovery agent 312 and/or 316 configured to contact a second set of routers to obtain a second type of information stored in each router in the second set of routers, and a phase controller 304 configured to select between the first and second topology discovery agents. The first and second sets of routers are different, and the first and second types of information are different. In one configuration, the first type of information is defined by a network management protocol, and the second type of information is defined by a routing protocol.

17 Claims, 16 Drawing Sheets

U.S. PATENT DOCUMENTS

| | | | |
|---|---|---|---|
| 5,636,350 A | 6/1997 | Eick et al. .................. 395/356 |
| 5,644,692 A | 7/1997 | Eick ............................ 395/326 |
| 5,734,824 A | 3/1998 | Choi ...................... 395/200.11 |
| 5,751,971 A * | 5/1998 | Dobbins et al. ............. 709/238 |
| 5,805,593 A | 9/1998 | Busche ........................ 370/396 |
| 5,850,397 A | 12/1998 | Raab et al. .................. 370/392 |
| 5,881,246 A * | 3/1999 | Crawley et al. ............. 709/238 |
| 5,943,317 A | 8/1999 | Brabson et al. ............. 370/238 |
| 5,966,513 A | 10/1999 | Horikawa et al. ...... 370/200.53 |
| 6,088,451 A | 7/2000 | He et al. |
| 6,108,702 A * | 8/2000 | Wood .......................... 709/224 |
| 6,119,171 A * | 9/2000 | Alkhatib ...................... 709/245 |
| 6,131,117 A | 10/2000 | C lark, et al. |
| 6,249,820 B1 * | 6/2001 | Dobbins et al. ............. 709/238 |
| 6,252,856 B1 | 6/2001 | Zhang |
| 6,256,675 B1 | 7/2001 | Rabinovich .................. 709/241 |
| 6,275,492 B1 * | 8/2001 | Zhang ......................... 370/392 |
| 6,360,255 B1 | 3/2002 | McCormack et al. ........ 709/221 |
| 6,405,248 B1 | 6/2002 | Wood .......................... 709/223 |
| 6,418,476 B1 * | 7/2002 | Luciani ....................... 709/238 |
| 6,430,612 B1 | 8/2002 | Iizuka ......................... 709/223 |
| 6,456,306 B1 | 9/2002 | Chin et al. ................... 345/810 |
| 6,744,739 B1 * | 6/2004 | Martin ........................ 370/254 |
| 6,859,878 B1 | 2/2005 | Kerr et al. |
| 6,895,436 B1 | 5/2005 | Caillau et al. |
| 2001/0034837 A1 | 10/2001 | Kausik et al. |
| 2001/0049786 A1 | 12/2001 | Harrison et al. ............. 713/156 |
| 2002/0087704 A1 | 7/2002 | Chesnais et al. ............ 709/228 |
| 2002/0112062 A1 | 8/2002 | Brown et al. ................ 709/229 |
| 2002/0116647 A1 | 8/2002 | Mont et al. .................. 713/201 |
| 2002/0128885 A1 | 9/2002 | Evans |
| 2002/0141593 A1 | 10/2002 | Kurn et al. |
| 2002/0144149 A1 | 10/2002 | Hanna et al. ................ 713/201 |
| 2002/0161591 A1 | 10/2002 | Danneels et al. ............... 705/1 |
| 2002/0188708 A1 | 12/2002 | Takahashi et al. |
| 2003/0004840 A1 | 1/2003 | Gharavy |
| 2003/0065626 A1 | 4/2003 | Allen |
| 2003/0065940 A1 | 4/2003 | Brezak et al. |
| 2003/0163686 A1 | 8/2003 | Ward et al. |

OTHER PUBLICATIONS

U.S. Appl. No. 10/127,967, filed Apr. 22, 2002, Goringe et al.

NET-SNMP, The NET-SNMP Project Home Page, Dec. 13, 2000, 5 pages, http://net-snmp.sourceforge.net.

OpenSSL, The Open Source Toolkit for SSL/TLS, Apr. 17, 2002, 2 pages, http://www.openssl.org.

Network Working Group, Management Information Base for Network Management of TCP/IP-based Internets: MIB-II, Mar. 1991, 62 pages, http://www.ietf.org/rfc/rfc1213.txt.

Network Working Group, The OSPF NSSA Option, Mar. 1994, 15 pages, http://www.ietf.org/rfc/rfc1587.txt.

Network Working Group, OSPF Version 2, Apr. 1998, 191 pages, http://www.ietf.org/rfc/rfc2328.txt.

Network Working Group, OSPF Version 2 Management Information Base, Nov. 1995, 71 pages, http://www.ietf.org/rfc/rfc1850.txt.

Network Working Group, RIP Version 2, Nov. 1998, 35 pages, http://www.ierf.org/rfc/rfc2453.txt.

Jason Novotny et al., "An Online Credential Repository for the Grid: MyProxy" from High Performance Distributed Computing, 2001 Proceedings. Berkely, CA (Aug. 2001), pp. 104-111.

Moy, J., Network Working Group, OSPF Version 2, Mar. 1994, pp. 62, 68-76, 85.

Y. Breitbart et al., "Topology Discovery in Heterogeneous IP Networks," Proceedings of IEEE Infocom 2000 (Mar. 2000), 10 pages.

B. Huffaker et al., "Topology Discovery by Active Probing," CAIDA (2002), 8 pages.

M.R. Meiss et al., "Standards-Based Discovery of Switched Ethernet Topology," Advanced Network Management Lab, (Apr. 2002), pp. 1-20.

R. Siamwalla et al., "Discovering Internet Topology," Cornell University (Jul. 1998), pp. 1-16.

PCT Written Opinion for Intl. App. No. PCT/US02/28467.

Matt Bishop et al., "Improving Security via Proactive Password Checking," *Computers and Security*, 14(3) (1995), pp. 233-249.

J. Case, "A Simple Network Management Protocol," Network Working Group, Request for Comments 1067 (Aug. 1988), pp. 1-33.

Chinese Patent Office's First Office Action for Intl. App. No. 02817388.0 (Atty. Ref. 4366-59-PCN).

PCT International Preliminary Examination Report for Intl. App. No. PCT/US02/28467 (Atty. Ref. 4366-59-PCT) dated Dec. 21, 20005.

* cited by examiner

| | 1812 | 1804 | 1806 | 1808 |
|---|---|---|---|---|
| 1800 | ⊖ 192.168.16.100 | 192.168.16.100 | 3 | 255.255.255.0 |
| | ⊖ 192.168.19.2 | 192.168.19.2 | 2 | 255.255.255.0 |
| | ⊖ 192.168.29.2 | 192.168.29.2 | 9 | 255.255.255.0 |
| | ⊖ 192.168.34.1 | 192.168.34.1 | 4 | 255.255.255.0 |

| 2000 | 1804 | 1806 | 1808 |
|---|---|---|---|
| ⊖ 192.168.17.2 | 192.168.17.2 | 1 | 255.255.255.0 |
| ⊖ 192.168.34.2 | 192.168.34.2 | 3 | 255.255.255.0 |
| ⊖ 192.168.35.1 | 192.168.35.1 | 7 | 255.255.255.0 |

FIG. 20

| | 1904 | 1908 | 1912 | 1916 | 1920 | 1924 |
|---|---|---|---|---|---|---|
| ① 192.168.16.0 | 192.168.16.0 | 3 | 192.168.34.1 | indirect(4) | ospf(3) | 255.255.255.0 |
| ① 192.168.17.0 | 192.168.17.0 | 1 | 192.168.17.2 | direct(3) | local(2) | 255.255.255.0 |
| ① 192.168.18.0 | 192.168.18.0 | 1 | 192.168.17.1 | indirect(4) | ospf(13) | 255.255.255.0 |
| ① 192.168.19.0 | 192.168.19.0 | 3 | 192.168.34.1 | indirect(4) | ospf(13) | 255.255.255.0 |
| ① 192.168.29.0 | 192.168.29.0 | 1 | 192.168.17.1 | indirect(4) | ospf(13) | 255.255.255.0 |
| ① 192.168.31.0 | 192.168.31.0 | 1 | 192.168.17.1 | indirect(4) | ospf(13) | 255.255.255.0 |
| ① 192.168.32.0 | 192.168.32.0 | 1 | 192.168.17.1 | indirect(4) | ospf(13) | 255.255.255.0 |
| ① 192.168.34.0 | 192.168.34.0 | 3 | 192.168.34.2 | direct(3) | local(2) | 255.255.255.0 |
| ① 192.168.35.0 | 192.168.35.0 | 7 | 192.168.35.1 | direct(3) | local(2) | 255.255.255.0 |

TOPOLOGY DISCOVERY BY PARTITIONING MULTIPLE DISCOVERY TECHNIQUES

CROSS REFERENCE TO RELATED APPLICATIONS

The present application claims priority from U.S. Provisional Application Ser. No. 60/317,719, filed Sep. 6, 2001, of the same title, to Goringe, et al., and from U.S. Provisional Application Ser. No. 60/347,050 filed Jan. 8, 2002, entitled "Topology Discovery by Partitioning Multiple Discovery Techniques," to Goringe, et. al., each of which is incorporated herein by this reference.

FIELD OF THE INVENTION

The present invention relates generally to networks and specifically to methods and devices for determining network or routing topology.

BACKGROUND OF THE INVENTION

Distributed processing networks are gaining increasing importance in our information-based society. FIG. 1 depicts a network topology of a simple data network. The network 100 comprises a plurality of routers 104a–g, a transit network 108, and a stub network 112, all interconnected by links 116a–i. As will be appreciated, a router is a device connecting two or more networks that routes incoming data or packets to an appropriate network/node; a transit network is a network containing more than router; a stub network is a network that is not configured to transit packets through the network from one router to another; and a link is a communication channel between two or more nodes. Each of the routers is typically attached to a link via one or more interfaces, such as interfaces 120a–n. The simple network of FIG. 1 is divided into two protocol regions with the dashed line 124 being the boundary between the two regions. Router 104c is located on the boundary 124 and is referred to herein as an area border router while the other routers 104a–b and d–g are not area border routers. One or more protocol regions are often autonomous systems. An autonomous system is a collection of networks controlled by a single administrative authority.

In a packet-switched network, the technique used to route a packet through interconnected networks depends on the routing protocol. Most protocols fall into one of two categories, distance-vector algorithms (which determine the distance between source and destination nodes by calculating the number of router hops a packet traverses en route from the source network to the destination network) and link-state algorithms (which use link state advertisement or LSA (containing the names and various cost metrics of a router's neighbors) to keep routers informed about links in the network). Rather than storing actual paths (which is the case with distance-vector algorithms), link-state algorithms store the information needed to generate such paths. Examples of router protocols using distance-vector algorithms include RIP and RIP-2 and using link-state algorithms include Open Shortest Path First or OSPF, OSI's IS-IS, EIGRP, and Netware's Link Service's Protocol (NLSP).

Routers and other network components are typically managed using a network management system. Network management systems perform network maintenance, identify possible security problems in the network, locate equipment, module, subassembly, and card failures, locate circuit outages, monitor levels of performance (e.g., bit error rates or BERs, loss of synchronization, etc.) and permit rapid and accurate quantification of network usage and traffic levels. Examples of network management systems used for performing the foregoing tasks include Hewlett-Packard's OpenView™, IBM's Netview™, and Digital Equipment Corporation's Enterprise Management Architecture or EMA™.

For optimal operation of network management systems, an accurate, detailed map of the network or OSI layer 3 topologies is commonly required. Such a map not only facilitates operation of the network management system but also permits newly attached hosts to be properly located and configured for the network (to avoid adversely impacting network performance) and existing hosts to be properly located for the newly attached host. In common practice, a detailed map of the network's topology is, in whole or part, unavailable to network management personnel. This can be due to poor record keeping, the sheer size and complexity of some networks, and the lack of central management of a network, such as where a network includes a number of autonomous systems or enterprises.

Simple Network Management Protocol or SNMP algorithms for discovering automatically network layer topology are used in many network management tools. The SNMP algorithms can take several approaches. In one approach known as the "hop-by-hop" approach, the algorithm accesses standard routing SNMP-Management Information Base or MIB information in each router on a hop-by-hop basis. As used herein, a "hop" refers to a portion of a route that has no intermediate nodes and "MIB" is the set of managed objects or variables that can be managed as defined by SNMP. MIB objects or variables are typically defined by the set of rules known as Structure of Management Information or SMI. As will be appreciated, MIB information is stored in the memory of any SNMP router. In another approach, vendor-specific proprietary algorithms are used to generate the topology. An example of such a solution is CDP™ by Cisco Systems. Such proprietary algorithms typically rely on the vendor-specific extensions to the standard SNMP MIBs that are generally not useful in a multi-vendor network.

SNMP network topology discovery algorithms are typically unable to ascertain Layer 3 topology when the routers in a network support differing routing protocols and/or are uncontactable. A router can be uncontactable for a variety of reasons including the use of improper credentials, a down state of the contacted interface, an inaccessible or nonexistent SNMP agent in the router, etc. This problem is illustrated by FIG. 2. Referring to FIG. 2, router 200 supports Routing Information Protocol or RIP and is SNMP contactable, routers 204, 208, and 212 support the Open Shortest Path First or OSPF protocol and are SNMP contactable, router 216 supports OSPF but is not SNMP contactable, and finally router 220 supports OSPF and RIP and is SNMP contactable. If the topology discovery algorithm initially contacts router 200, it will, by the hop-by-hop approach, be able to discover routers 200, 220 and 216. When the algorithm contacts router 216, which is not SNMP contactable, the algorithm will be unable to discover routers 204, 208, and 212. This is so because the algorithm will be unable to access the MIB information in router 216, thereby preventing the algorithm from learning of the existence of these routers.

SUMMARY OF THE INVENTION

These and other needs are addressed by the various embodiments and configurations of the present invention. Generally, the architecture of the present invention uses multiple topology discovery techniques to discover network topology. The differing discovery techniques can be network management protocol- and/or routing protocol-specific. The use of a network management protocol-specific discovery algorithm can make the algorithm discovery agnostic (or insensitive).

In one embodiment that is particularly useful for an enterprise network or autonomous system, a hop-by-hop discovery algorithm, such as an SNMP topology discovery technique, is combined with one or more other discovery algorithms, such as an OSPF discovery algorithm, a discovery algorithm based on proprietary standards, and a vendor-specific topology discovery algorithm, to perform topology discovery. The topology discovery mechanism is typically designed to be insensitive to routing protocol. This is made possible by the hop-by-hop approach, where each router is contacted to find out the other entities in the network known to the contacted router. Each router is contacted in turn to build a database regarding the various network entities and their topology connections.

Whenever a router is discovered by the hop-by-hop method, it is queried to identify which protocols have been used to define its route table. If these protocols have specific discovery algorithms associated with them, the corresponding discovery algorithm is run. Any additional data found is added to a network model, and any additional routers discovered are made available to the hop-by-hop algorithm for further exploration. Routers discovered using the alternative discovery algorithm(s) can be used to "jump over" uncontactable routers such as router 216 in FIG. 2. Referring to FIG. 2, using an OSPF topology discovery algorithm in addition to an SNMP discovery algorithm would disclose OSPF area information on any of routers 204, 208, 212, and 216. The area information would identify that the uncontactable router 216 exists, but no other information can then be deduced.

In another embodiment, the architecture uses a number of discovery agents to discover heterogeneous networks executing a variety of different routing protocols. Each discovery agent is configured to interact with router information defined by one or more of the routing protocols. The various discovery agents can be operated in discrete phases, in parallel, or on a router-by-router basis.

The architecture of the present invention can have a number of advantages. For example, the use of differing discovery techniques can locate network components even though the network components support differing protocols. This advantage can be illustrated with reference to the configuration of the architecture using both MIB and OSPF discovery techniques. As used herein, "MIB" is considered as referring to all versions of the Management Information Base, "SNMP" to all versions of the Simple Network Management Protocol, and "OSPF" to all versions of the OSPF protocol. The advantage of MIB discovery is that it will discover an IP network topology regardless of what routing protocols are present. The disadvantage of this approach is that the MIB discovery agent must visit each router in the network to discover the entire network. If a router is not contactable via SNMP as discussed above with reference to FIG. 2, the MIB discovery agent will discover only a subset of the network. Using OSPF discovery alone will only discover the parts of a network that are executing the OSPF routing protocol. OSPF discovery techniques can, however, quickly identify large areas of a network by contacting only a small number of routers (e.g., area border routers), thereby insulating such techniques from being thwarted by an uncontactable router. Thus, OSPF discovery may find routers that MIB discovery could not, because OSPF can determine a network topology without having to visit each router. In particular, OSPF may discover part of a network that is unreachable due to an uncontactable router blocking MIB discovery as noted above with reference to FIG. 2. Using two discovery techniques together allows MIB discovery to find all contactable and uncontactable routers in the network regardless of the routing protocols present in the network. Parts of the network that are not contactable can often be discovered by using OSPF discovery to "hop" over an uncontactable router for later discovery by MIB discovery.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

BRIEF DESCRIPTION OF THE DRAWINGS

FIG. 20 is a typical ipAddr table;

FIG. 21 is a typical ipRoute table;

DETAILED DESCRIPTION

To discover the topology of a network with multiple routing protocols present, a phased discovery approach is employed. There are three main phases required to discover a network topology. In the initial gateway detection phase, the architecture contacts a seed router to initiate the discovery process. In the MIB or MIB2 discovery phase, the architecture contacts each of the routers in the enterprise network to download selected MIB information in the routers. In the OSPF discovery phase, the architecture contacts routers supporting OSPF to download link state advertisements from the link state advertisement database in the OSPF routers.

Before discussing the operation of the data collection and analyzing agent 208, it is important to understand certain features of many routing protocols. A router can be identified by a unique router ID in the case of certain protocols, and associated with a unique area ID. A router typically does not itself have an IP address. An interface is a logical device belonging to a host such as a router than can be the attachment point of a link. Typically, an interface will have zero or one IP address and belong to a network. The interface will normally have an interface number and a network mask. A link contains two or more bindings of a source interface and a metric or cost. It is templated by the metric representation which is specific to the routing protocol and represents the cost for a packet to leave an interface. A link is typically associated with a cost metric and a routing protocol identifier. A network object represents a data network or subnet. It has an address and a mask and represents an address space in which a set of hosts is contained. A network object may derive its address and/or its mask from its member interfaces.

The Network Topology Discovery System

Figure 1:
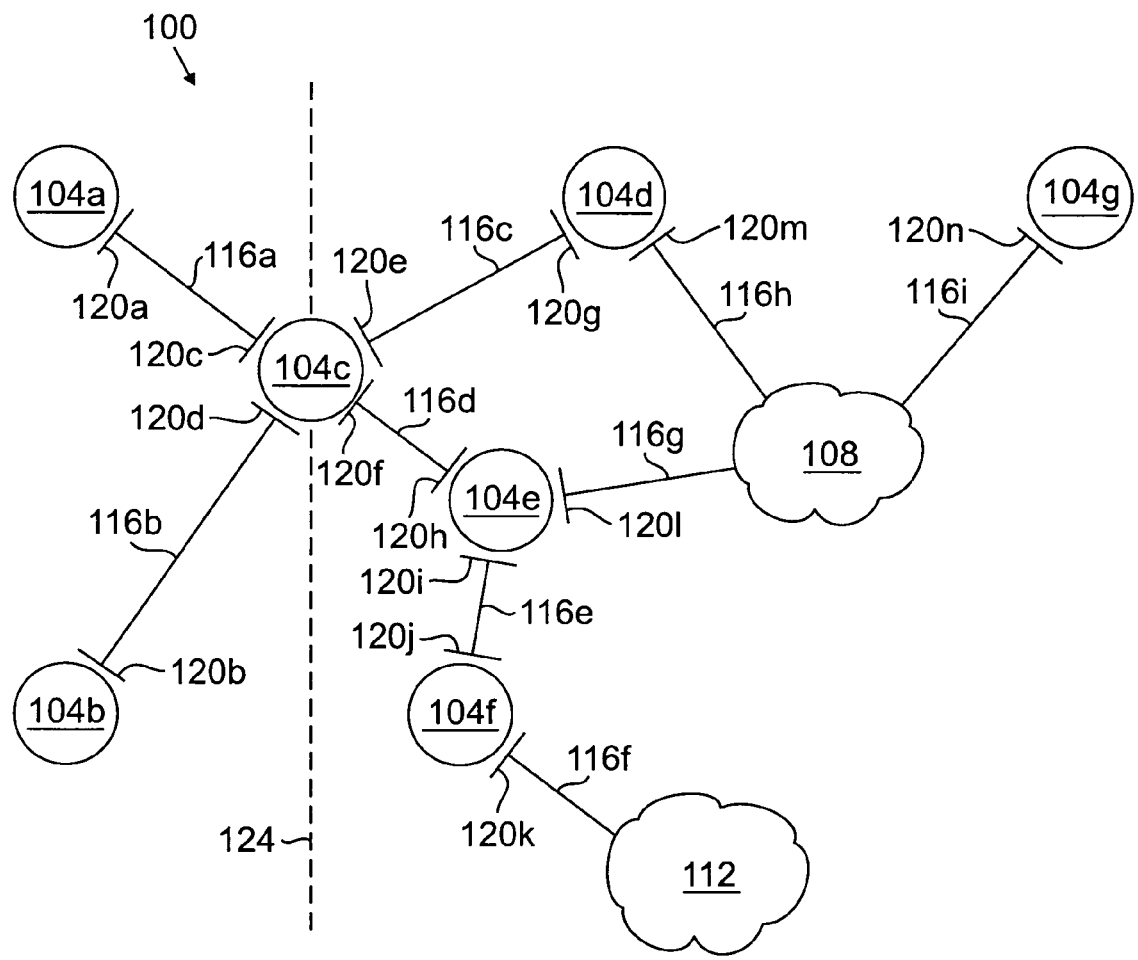
FIG. 1 depicts a simple network topology according to the prior art.
Figure 2:
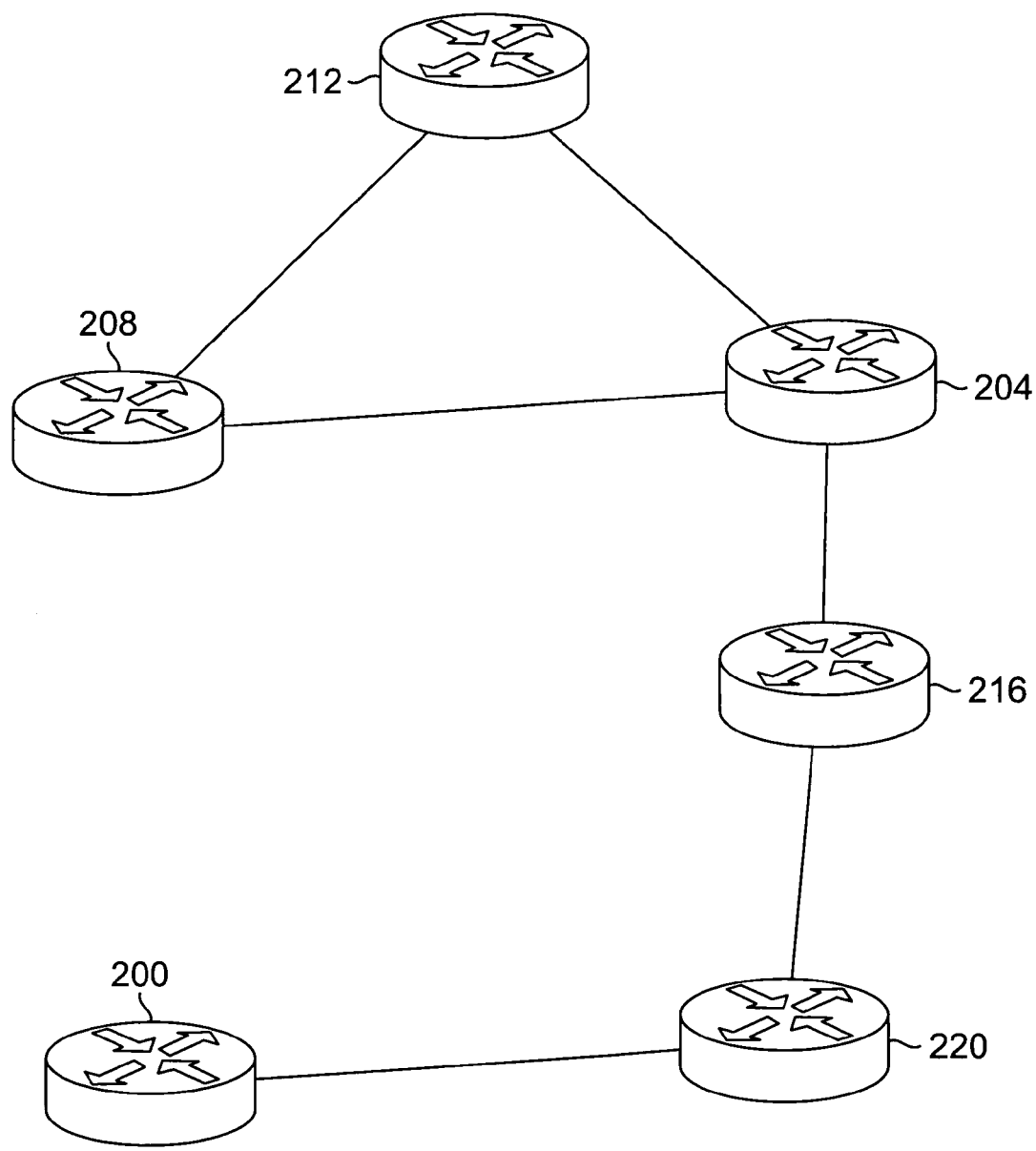
FIG. 2 depicts another simple network topology according to the prior art.
Figure 3:
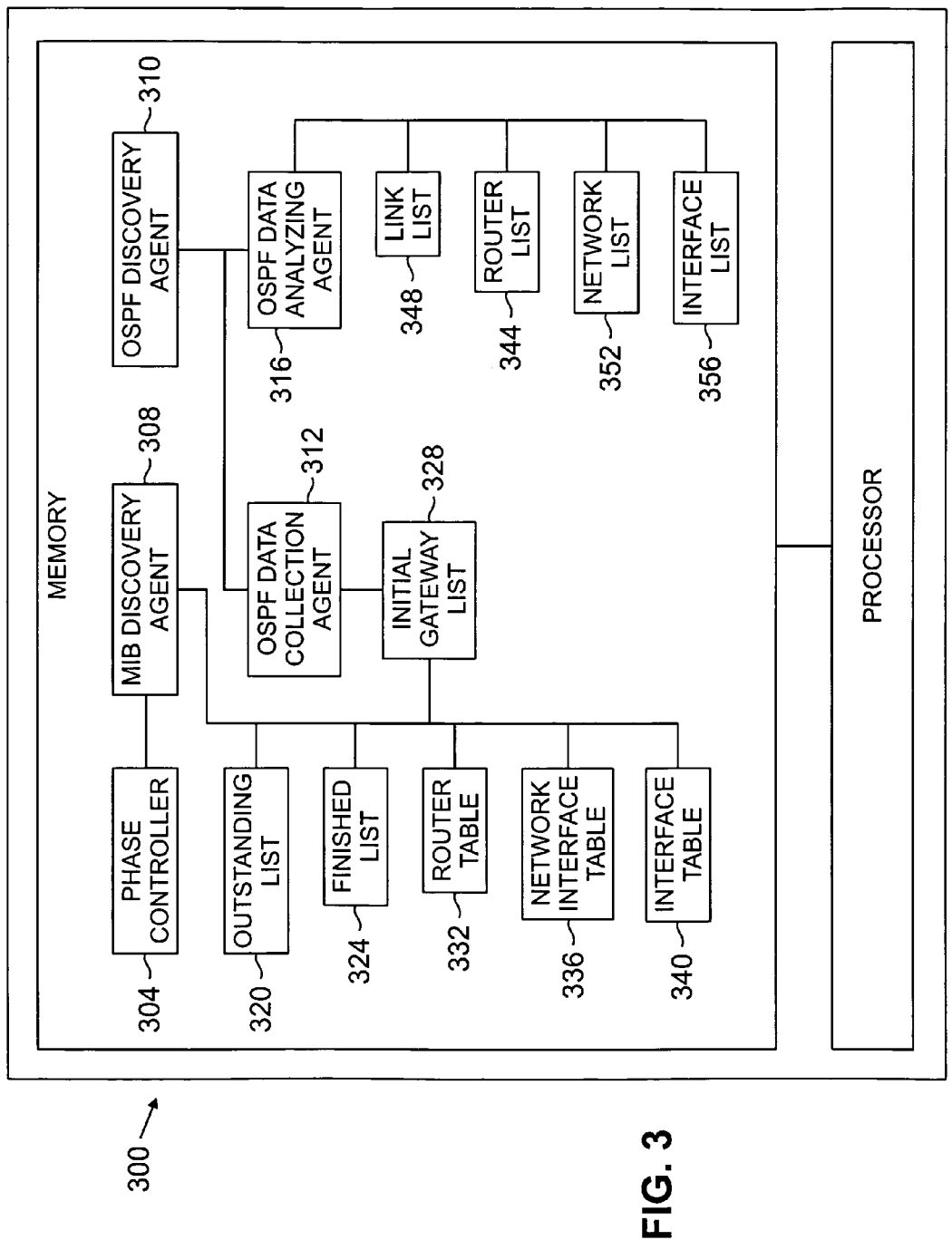
FIG. 3 is a block diagram depicting a computational architecture according to an embodiment of the present invention.

With this in mind, FIG. 3 refers to a network topology discovery system 300 according to an embodiment of the present invention. The system 300 is configured to be connected to an access point of a computer network, such as to stub network 112, to send communications to and receive communications from hosts, typically routers. The system 300 comprises a phase controller 304 configured to oversee execution of each of the three phases in the appropriate order and determine when the discovery process is completed, an MIB discovery agent 308 configured in the MIB discovery phase to access the MIB information in each contactable router and generate an MIB output describing a portion of the network topology, and an OSP discovery agent 310 comprising an OSPF data collection agent 312 configured in the OSPF discovery phase to gather selected information regarding the network topology by contacting selected routers in each desired routing region and an OSPF data analyzing agent 316 configured in the OSPF discovery phase to analyze the information gathered by the OSPF data collection agent 312 and generate an OSPF output describing a portion of the network topology.

Figure 11:
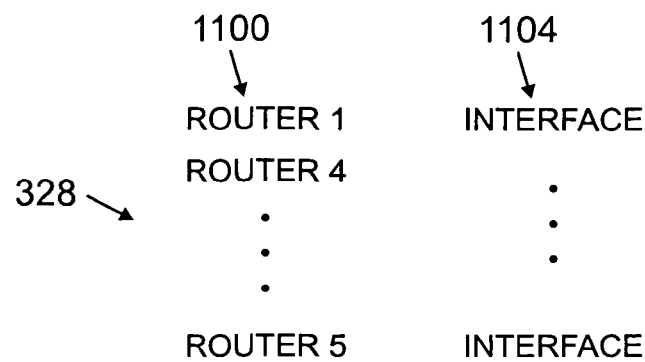
FIG. 11 is an initial gateway list maintained by the phase controller.
Figure 12:
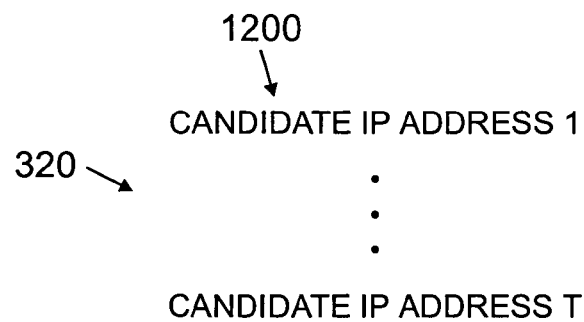
FIG. 12 is an outstanding list maintained by the phase controller.
Figure 13:
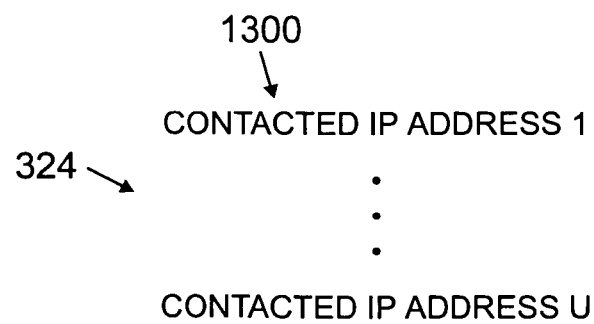
FIG. 13 is a finished list maintained by the phase controller.

During topology discovery, the system 300 maintains a number of listings (outstanding, finished, and initial gateway lists, an area border router table (not shown), and a link state advertisement table (not shown)) to avoid duplication of computational effort. The outstanding list 320 (FIG. 12) lists candidate host (interface) addresses 1200 yet to be contacted. During the MIB and OSPF discovery phases, as new router interface addresses are discovered they are appended to the outstanding address list 320. The MIB discovery phase will normally take the first address off the outstanding list and explore the router that the interface address is connected to. The finished list 324 (FIG. 13) lists host (interface) addresses 1300 that have been contacted and do not need to be contacted again. After a router interface on the outstanding address list has been processed, the corresponding router interface address is moved from the outstanding list to the finished list. The initial gateway list 328 (FIG. 11) lists OSPF routers 1100 (by a pointer to the pertinent router entry in the router table discussed below) and corresponding interface(s) 1104 (by a pointer to the pertinent interface entries in the interface table discussed below) discovered during operation of the MIB discovery agent 308. These routers are explored during the OSPF discovery phase. The area border router table lists OSPF area border routers discovered during operation of the OSPF discovery agent 310 and includes, for each router entry, an indication of whether or not the routers have been contacted and, if so, the result. Finally, the link state advertisement table is output by the OSPF data collection agent 312 and is a listing of link state advertisements or LSAs obtained from the link state databases in the contacted OSPF routers. As will be appreciated, the link state database, as defined by the OSPF protocol, is a listing of links with each link being defined by end points and a cost metric associated with the link. Each area border router within a routing region has a complete copy of the database for all regions on whose border the router is located (or with which the area border router is associated). However, the non-area border routers within one routing region typically have a complete copy of the database in the region in which it is located and do not have the same link state database as a router in a different routing region.

Figure 8:
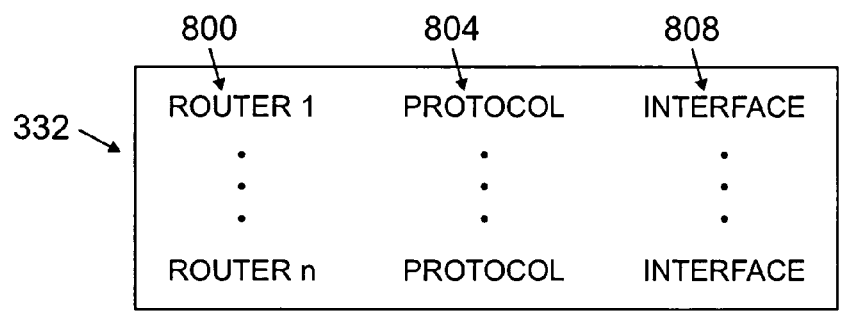
FIG. 8 is a router table output by the MIB discovery agent.
Figure 9:
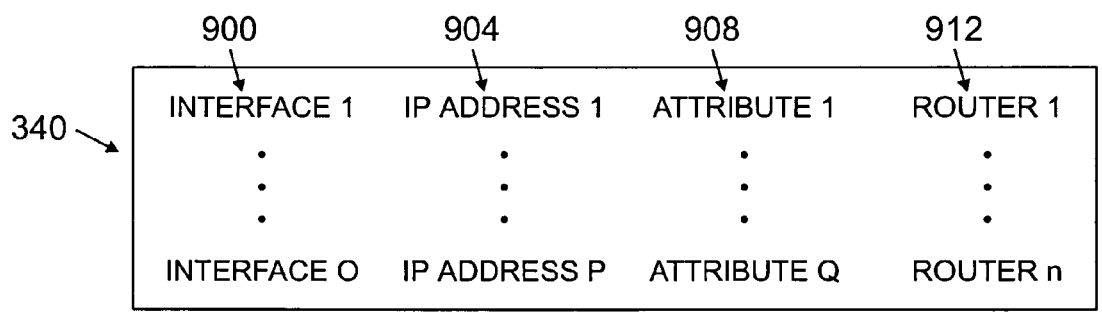
FIG. 9 is an interface table output by the MIB discovery agent.
Figure 10:
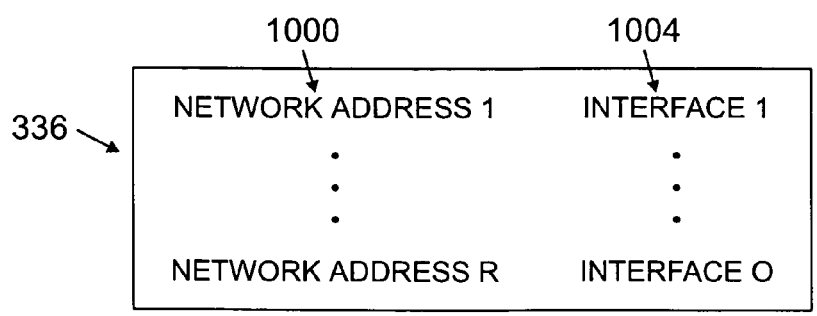
FIG. 10 is a network interface table output by the MIB discovery agent.
Figure 14:
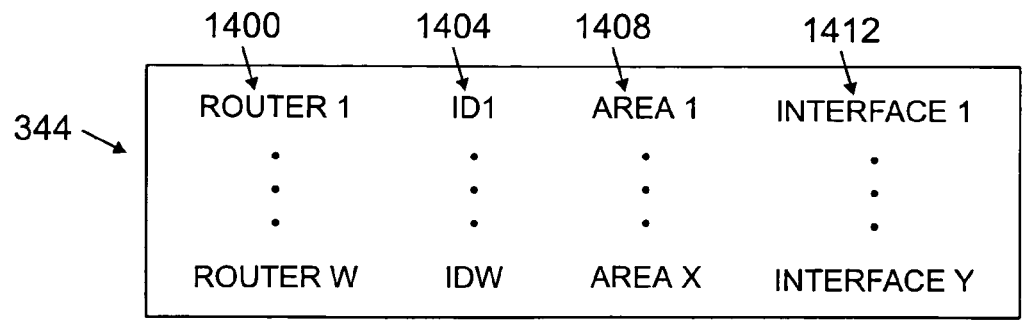
FIG. 14 is a router list output by the OSPF discovery agent.
Figure 15:
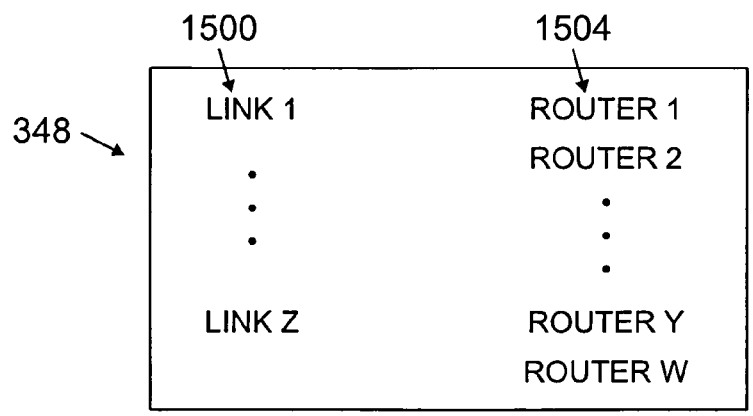
FIG. 15 is a link list output by the OSPF discovery agent.
Figure 16:
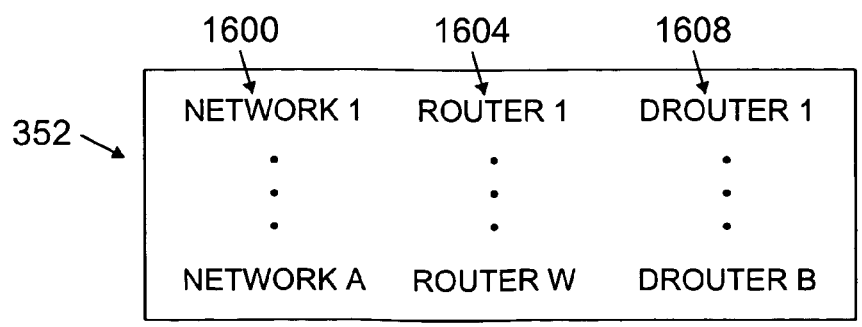
FIG. 16 is a network list output by the OSPF discovery agent.

The system 300 provides a number of output tables, namely the router, network interface, and interface tables 332, 336, and 340, respectively, output by the MIB discovery agent 308 after completing the MIB discovery phase and the router, link, network, and interface lists 344, 348, 352, and 356, respectively, out put by the OSPF discovery agent 310 after completing the OSPF discovery phase. Referring to FIG. 8, the router table 332 contains, for each discovered router 800, a corresponding protocol identifier 804 and one or more corresponding attached interfaces 808 (which are typically identified by a pointer to the corresponding entry in the interface table 340). Referring to FIG. 9, the interface table 340 contains, for each interface 900, a corresponding IP address 904, one or more corresponding attributes 908 (e.g., whether the interface was contactable, speed, interface type, cost metrics, up/down status, etc.), and the corresponding router 912 owning the interface (which is typically identified by a pointer to the corresponding entry in the router table 332). Referring to FIG. 10, the network interface table 336 lists, for each network address 1000 (or other type of network identifier), one or more corresponding interfaces 1004 (which are typically identified by a pointer to the corresponding entries in the interface table 340) connected to the network. Referring to FIG. 14, the router list 344 contains a comprehensive listing of routers 1400, both designated and attached, in the enterprise network or autonomous system. The routers are identified by router ID 1404 (and/or by one of the router's interface IP addresses (not shown)), associated area identifiers 1408, and/or by one or more pointers 1412 referencing associated interfaces, in the interface list. As will be appreciated, an area border router will have multiple region IDs while a non-area border router will have only one, and a router can have one or more associated interfaces. Referring to FIG. 15, the link list 348 lists the discovered links. The links 1500 can have as endpoints 1504 two routers or a router and a network (stub or transit). The routers can be identified by router ID and/or interface IP address, and the network by mask and/or one or more IP addresses. Referring to FIG. 16, the network list 352 is a listing of networks 1600 (stub or transit). The networks 1600 are identified by a network address and mask and/or one or more IP addresses that are connected to the network. Each network has an associated set of router interfaces 1604 (which is typically indicated by a pointer to the corresponding router interface in the interface list), and an associated designated router 1608 (which is typically indicated by a pointer to the corresponding router in the router list). Finally referring to FIG. 17, the interface list 356 lists interfaces 1700 identified by IP address, interface number, and/or network mask. Each interface 1700 is associated with a router 1704. The associated router 1704 is typically indicated by a pointer to the corresponding router in the router list 344.

These tables collectively provide the network routing topology and the attributes of the network elements represented therein. As will be appreciated, "routing topology" refers to the logical network topology described by a particular routing protocol. Based on the router, interface and network interface tables and the router, link, network, and interface lists, a map or model of the routing topology can be generated automatically or manually. If more than one routing protocol is in use, there may be more than one distinct routing topology. As will be appreciated, the routing topology can be quite different from the physical network topology.

Operation of the Phase Controller

Figure 4:
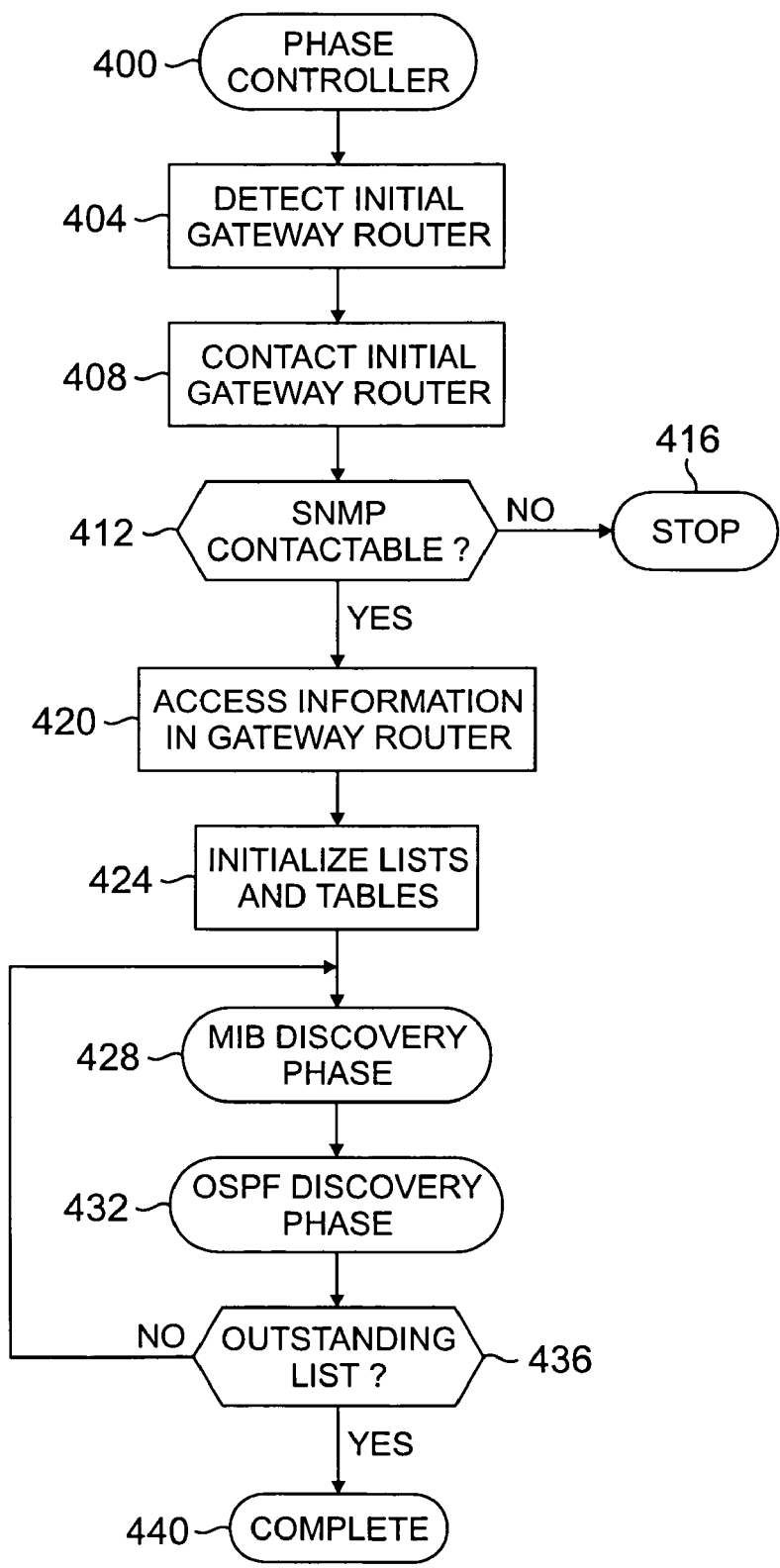
FIG. 4 is a flowchart depicting the operation of the phase controller.

The operation of the phase controller 304 will now be described with reference to FIG. 4.

After creation of the phase controller 304 in step 400, the phase controller 304 performs initial gateway detection in step 404. The phase controller typically uses one or more seed IP addresses to contact a host router. The router(s) contacted initially by the phase controller 304 are typically referred to as a gateway router(s). In a preferred implementation, only one seed IP address is employed. If the user has not configured the phase controller to use a particular router as the initial gateway, the seed address can be determined automatically. The method by which this is determined is platform-dependent. For all platforms, the gateway is taken from the first routing table entry that has a valid gateway field. The Simple Network Management Protocol or SNMP techniques used to contact the gateway router can be routing protocol specific. For example, RFC1850 provides the specifications for contacting a router using the OSPF protocol. the phase controller 304 attempts to contact the initial gateway router in step 408.

In decision diamond 412, the phase controller 304 determines whether the gateway router was successfully contacted using SNMP techniques. When the contact attempt was not successful, the phase controller in step 416 terminates operation and notifies the user of an error and requests a further seed address. When the contact attempt is successful, the phase controller in step 420 accesses the MIB information in the initial gateway router and in step 424 initializes the outstanding and finished lists and appends the interface address of the contactable interface of the gateway router in the outstanding list for later use in the MIB discovery phase.

The phase controller in step 428 then calls the MIB discovery agent 308 to cause the agent to perform the MIB discovery phase. The operation of the MIB discovery agent is discussed below with reference to FIGS. 5 and 6.

When the MIB discovery phase is completed, the phase controller in step 432 calls the OSPF discovery agent 310 (or directly calls the OSPF data collection agent 312 first and then the OSPF data analyzing agent 316) to perform the OSPF discovery phase. The operations of these agents are discussed below with reference to FIG. 7. The phase controller can use an observer pattern to monitor the progress of the MIB discovery agent and the OSPF discovery agent (or directly calls the OSPF data collection agent and the OSPF data analyzing agent).

When the OSPF discovery phase is complete, the phase controller determines in decision diamond 436 whether the outstanding list 320 is empty. If candidate entries 1200 remain in the outstanding list 320, the phase controller repeats steps 428 and 432. If no candidate entries 1200 remain in the outstanding list 320, the phase controller proceeds to step 440 and terminates operation.

Operation of the MIB Discovery Agent

Figure 5:
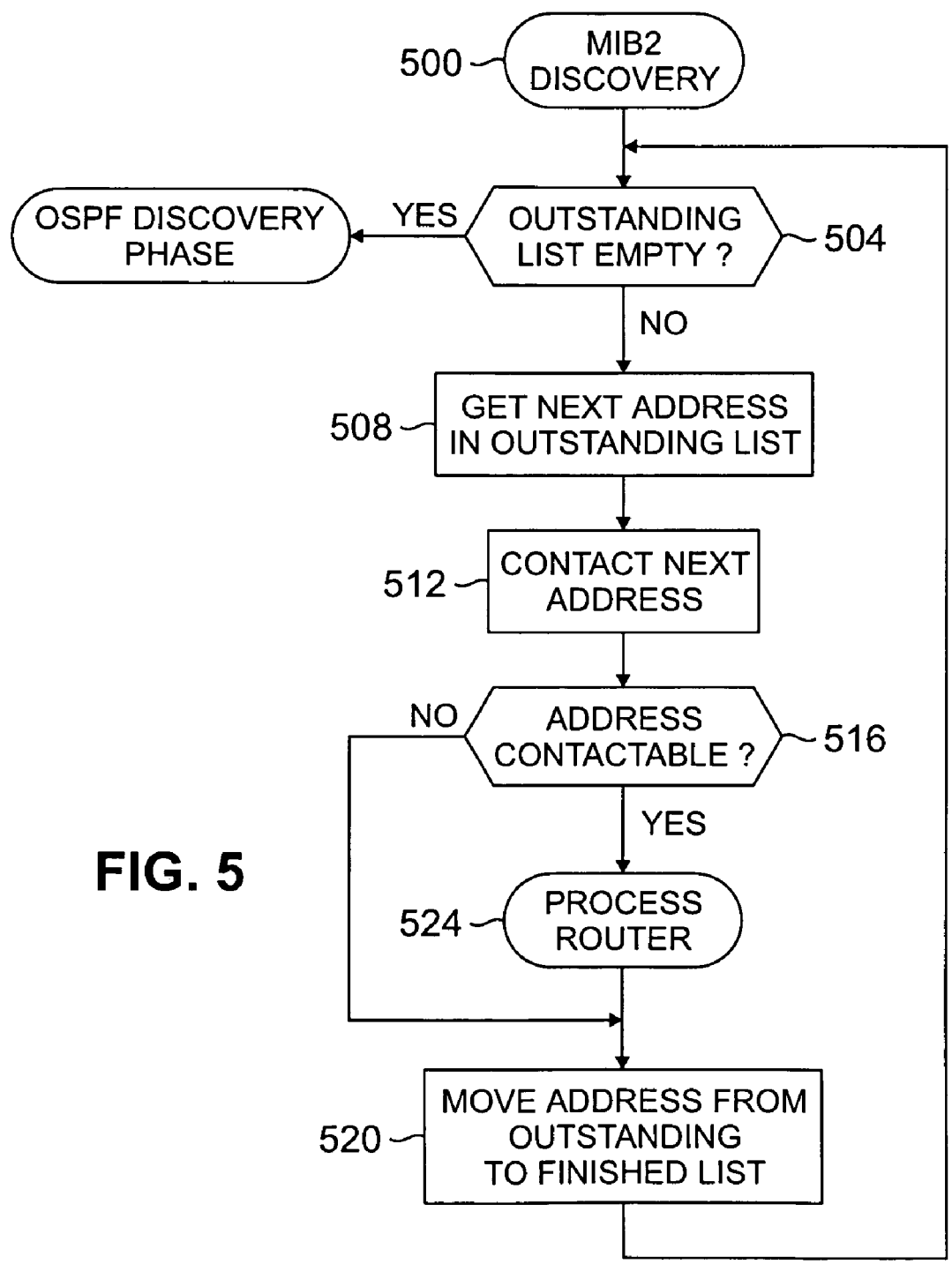
FIG. 5 is a flowchart depicting the operation of the MIB discovery agent.

The operation of the MIB discovery agent 308 will now be discussed with reference to FIGS. 5 and 6. Generally, the MIB discovery agent 308 iteratively takes the next interface address from the outstanding list 320, contacts the router corresponding to the interface address, processes the router's routing tables, and then moves the interface address from the outstanding list 320 to the finished list 324. To avoid unnecessary network traffic and waste of computational resources, the MIB discovery agent is preferably configured so that when one interface of a router is contacted successfully the other interfaces of that router are not later contacted by the MIB discovery agent.

The MIB discovery agent 308 is created in step 500. In decision diamond 504, the MIB discovery agent 308 determines whether the outstanding list 320 is empty. When the list 320 is empty, the agent 308 ceases operation and the phase controller creates the OSPF data collection agent 312. When the list 320 is not empty, the agent 308 proceeds to step 508 and gets the next interface address on the outstanding list 320.

In step 512, the agent 308 contacts the interface address, and in decision diamond 516 the agent 308 determines whether the address was contactable. When the address is not contactable, the agent proceeds to step 520 in which the interface address is moved from the outstanding list 320 to the finished list 324 and returns to decision 504 for the next iteration through the loop. When the address is successfully contacted, the agent 308 in step 524 processes the router as further described with reference to FIG. 6.

Figure 6:
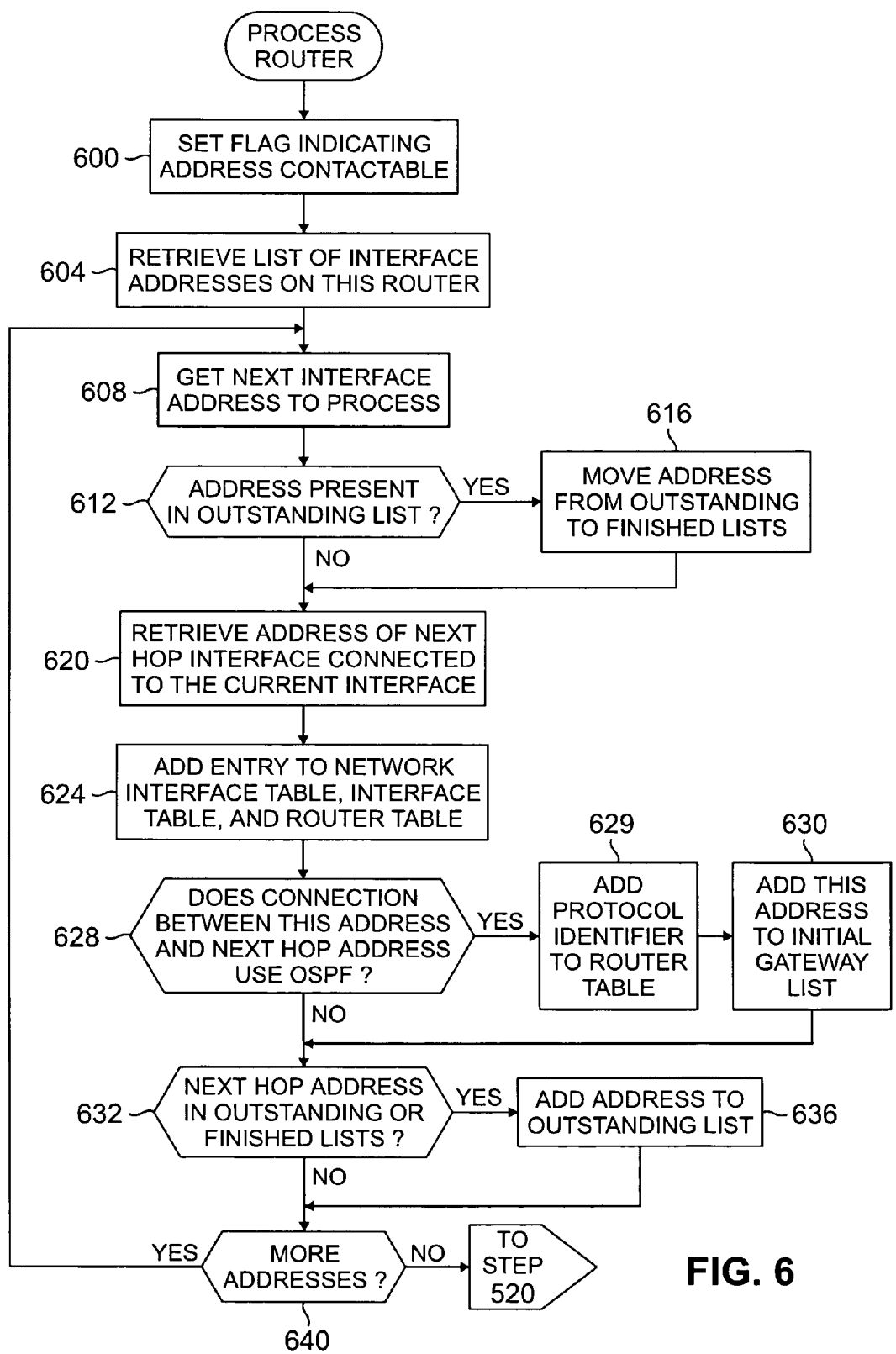
FIG. 6 is another flowchart depicting the operation of the MIB discovery agent.

Referring to FIG. 6, processing of the router by the MIB discovery agent will now be described.

In step 600, the MIB discovery agent 308 sets a flag associated with the interface address indicating that the address was successfully contacted. The flag may be contained in the outstanding list.

In step 604, the agent 308 retrieves the list of interface addresses attached to the router corresponding to the contacted interface address. This information is contained in the router's SNMP tables. The SNMP tables retrieved by the agent are the ipAddr table, ipAddrTable table, ipRouteTable table, and ipRouteEntry table ("the Tables"), as defined in the IETF's RFC 1213 standard. As will be appreciated, the ipAddr table lists the IP addresses of the router's interfaces. The ipRouteTable table can be used to determine how each interface on the current router is connected to an interface on another router in the network (also referred to as the next hop interface). The table also describes the routing protocol, such as OSPF, present on the link between two router interfaces.

In step 608, the agent retrieves the next interface address corresponding to the router (being processed) for processing. Prior to processing the address, the agent determines in decision diamond 612 whether the retrieved address is in the outstanding list 320. When the retrieved address is in the outstanding list 320, the address in step 616 is moved from the outstanding list 320 to the finished list 324. Thereafter or when the retrieved address is not in the outstanding list 320, the agent 308 then proceeds to step 620.

In step 620, the agent 308 retrieves the address of the next hop interface connected to the current interface of the router being processed. Based upon the information associated with the next hop interface, one or more entries is added to the network interface table 336, the interface table 340, and/or the router table 332. If not done previously, the tables are initialized prior to addition of the entries.

Figure 24:
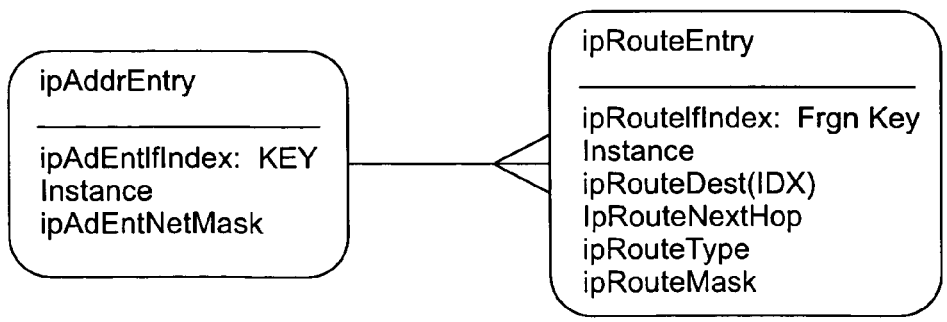
FIG. 24 depicts the relationship between the ipAddr Entry and ipRouteEntry tables.

The techniques used in step 624 to process the next hop interface addresses in the Tables will be known to those skilled in the art familiar with SNMP. As will be appreciated, the ipAddrTable::ipAdEntIfIndex acts as a key to each interface address specification in the ipAddrTable table. As shown in FIG. 24, the ipRouteEntry table is joined to the ipAddrTable table using the ipRouteEntry::ipRouteIfIndex as a foreign key (on ipRouteEntry::Instance). This relationship represents a one-to-many relationship between the ipAddrTable and ipRouteEntry table. For each ifAddrEntry there is 0 or more ipRouteEntry's that describe which network an interface is connected to and which interface is used to reach that network (using ipRouteEntry::ipRouteNextHop). If there are no ipRouteEntry's then the interface is not in use.

The tables can be used to differentiate a transport network from a stub network. When the packet can pass directly from the contacted interface to the network (or the interface is connected directly to a network (which is confirmed by the ipRouteType field designation of "direct")) the network is assumed to be a stub network. When a packet must pass from the contacted interface through a network to reach another network (or the interface is connected indirectly to the endpoint network listed in the ipAddrTable table (which is confirmed by the ipRouteType field designation of "indirect")), the intermediate network is a transport network.

Unnumbered interfaces must also be considered. For an interface to be unnumbered it must meet the criteria of appearing in the ipTable but not in the ipAddressTable, having an "Up" status in the ipTable, and not being an ethernet interface. Unnumbered interfaces will always be connected to another router using a point-to-link and to another unnumbered interface on the next router. In this case, the ipRouteTable on the current router will have a next hop address for the unnumbered interface as an arbitrary (numbered) interface address on the next router.

Figures 17, 18:
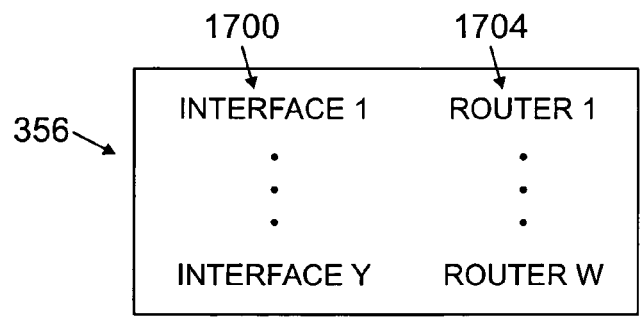
FIG. 17 is an interface list output by the OSPF discovery agent.
FIG. 18 is a typical ipAddrTable table.
Figure 19:
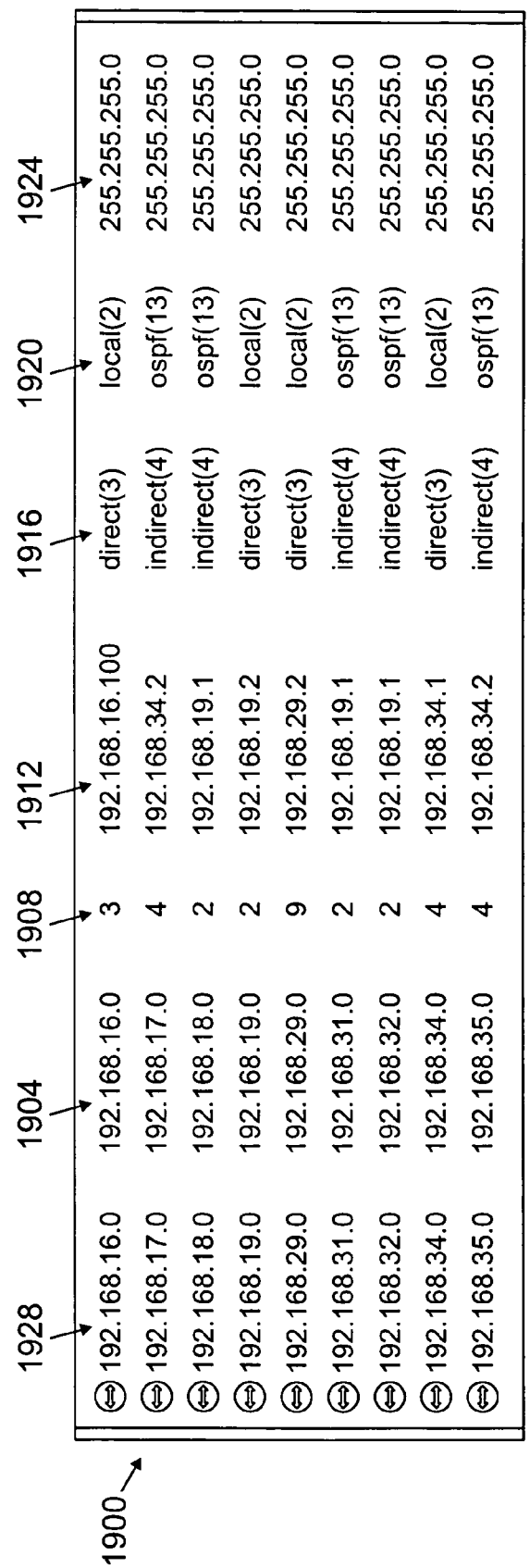
FIG. 19 is a typical ipRouteEntry table.

FIGS. 18–21 illustrate the ipAddrTable table, ipRouteEntry, and ipRouteTable tables. FIG. 18 is the ipAddrTable table and contains, for each instance 1800, ipAdEntAddr (IDX) 1804, ipAdEntIfIndex 1806 and ipAdEntNetMask 1808. As will be appreciated, an "instance" refers to an occurrence of an interface IP address. FIG. 19 is the ipRouteEntry table and contains, for each instance 1900, ipRouteDest(IDX) 1904, ipRouteIfIndex 1908, ipRouteNextHop 1912, ipRouteType 1916, ipRouteProto 1920 or the routing protocol supported by the connection between the subject interface and the next hop address 1912, and ipRouteMask 1924. FIG. 20 is the ipAddrTable table and contains, for each instance 2000, the same variables as the ipAddrTable table of FIG. 18. Finally, FIG. 21 is the ipRouteTable table and contains, for each instance 2100, the same variables as the ipRouteEntry table.

To illustrate the use of the above tables, several examples will now be discussed based on the tables of FIGS. 18–21. The interface address 192.168.34.1 or instance 1812 in the ifAddrEntry table (FIG. 18), has an index of 4 and three joined entries 1902, 1928 and 1929 in the ipRouteEntry table (FIG. 19). Looking at the entry 1928 shows that the network 192.168.34.0 can be reached from the 192.168.34.1 interface. This is logical as the interface address is a Class C address ending in 34.1 and is confirmed by the ipRouteType field value, "Direct(3)". This interface is therefore directly connected to the 192.168.34.0 network and without further information the network is assumed to be a stub-network. The third entry 1929 shows that the network 192.168.35.0 can be reached via the interface 192.168.34.2 but, as shown by entry 1916, is only indirectly connected as specified by the ipRouteType field "indirect(4)". The router that is the first hop towards this network can be reached by the next hop interface 192.168.34.2 as specified by the ipRouteNextHop field. To reach the 192.18.35.0 network a packet must pass through the 192.168.34.0 network, the 192.168.34.0 network is defined as a transport network. Since the 34.0 network was previously assumed to be a stub-network it now needs to be updated to be a transport network. On inspection of the ifAddrEntry (see FIG. 20) and ifRouteEntry (see FIG. 21) tables on the router with interface 192.168.34.2, it can be seen that the router connects to the 192.168.35.0 network via the 192.168.35.1 interface (see last entry in FIG. 21). This is determined by the 192.168.35.1 interface (entry 2002 in FIG. 20) in ifAddrEntry and the corresponding row in ifRouteEntry (ipRouteIndex =7) (entry 1908 in FIG. 21). The ipRouteType field 1916 specifies that this connection is "direct(3)" indicating that this interface is directly connected to the 35.0 network. The 192.168.34.2 router table (FIG. 21) also shows that this router is directly connected to the 17.0 network (see third entry from the top in FIG. 21) via the interface 192.168.17.2.

Returning to FIG. 18, there are three other interfaces that can also be explored. These are 192.168.16.100 (the original gateway interface), 192.168.19.2 and 192.168.29.2 interfaces. The joined ipRouteEntry table entries in FIG. 19 for these interfaces show that this router is also connected to: (i) the 192.168.16.0 network directly via the 192.168.16.100 interface; (ii) the 192.168.19.0 network directly via the 192.168.19.2. interface; (iii) the 192.168.18.0 network indirectly via the 192.168.19.2 interface (and the next hop interface is 192.168.19.1 on a newly discovered router); and (iv) the 192.168.29.0 network directly via the 192.168.29.2 interface.

Figure 22:
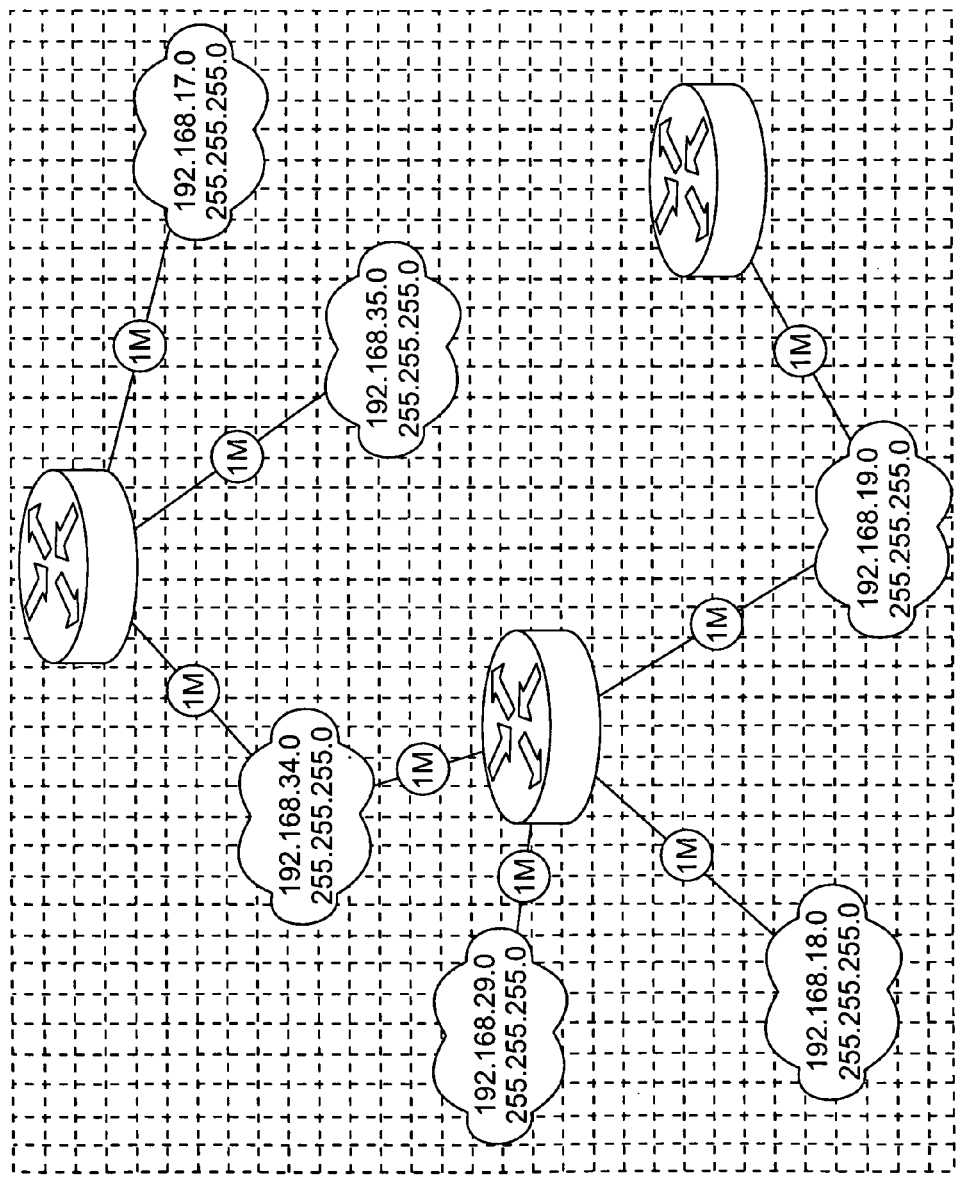
FIG. 22 is a network topology based on selected entries in the ipAddrTable, ipRouteEntry, and ipRoute tables of FIGS. 18–19 and 21.
Figure 23:
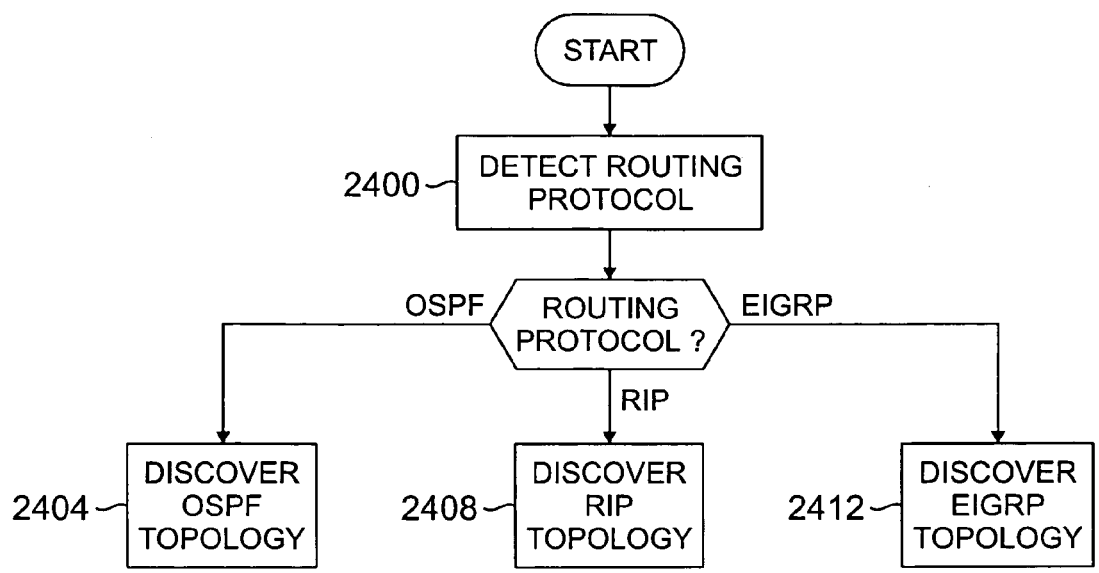
FIG. 23 is a flowchart depicting a multi-routing protocol architecture according to another embodiment of the present invention.

The network topology based on the foregoing analysis of FIGS. 18–21 is shown in FIG. 22

Returning again to FIG. 6, the agent 308 in step 628 determines whether the connection between the present interface and the next hop address uses OSPF. This is determined based upon the ipRouteProto 1920 entry in FIGS. 19 and/or 21. When the connection supports OSPF, an OSPF protocol identifier is added to the router table 332 in step 629 and the interface address is added to the initial gateway list 328 in step 630 for later exploration in the OSPF discovery phase. In either event, the agent 308 next proceeds to decision diamond 632.

In decision diamond 632, the agent 308 determines whether the next hop address is in the outstanding or finished lists 320, 324. When the next hop address is not in either list, the next hop address is added to the outstanding list 320 in step 636. In either event, the agent 308 proceeds to decision diamond 640.

In decision diamond 640, the agent 308 determines whether there is another interface address attached to the contacted router that has not yet been considered. If another address has not yet been considered, the agent 308 returns to step 608 and repeats the above steps for that address. If no addresses remain to be considered, the agent 308 proceeds to step 520 of FIG. 5.

Operation of the OSPF Data Collection and Data Analyzing Agents

The operation of the OSPF data collection and data discovery agents 312 and 316 will now be discussed with reference to FIG. 7. Generally, each of the interface addresses in the initial gateway list 328 is used as an initial gateway starting point for the OSPF data collection agent 308 in the OSPF discovery phase. OSPF routers that were discovered by a previous OSPF discovery run do not need to be used as initial gateway starting points on subsequent runs of the OSPF data collection agent 312.

Figure 7:
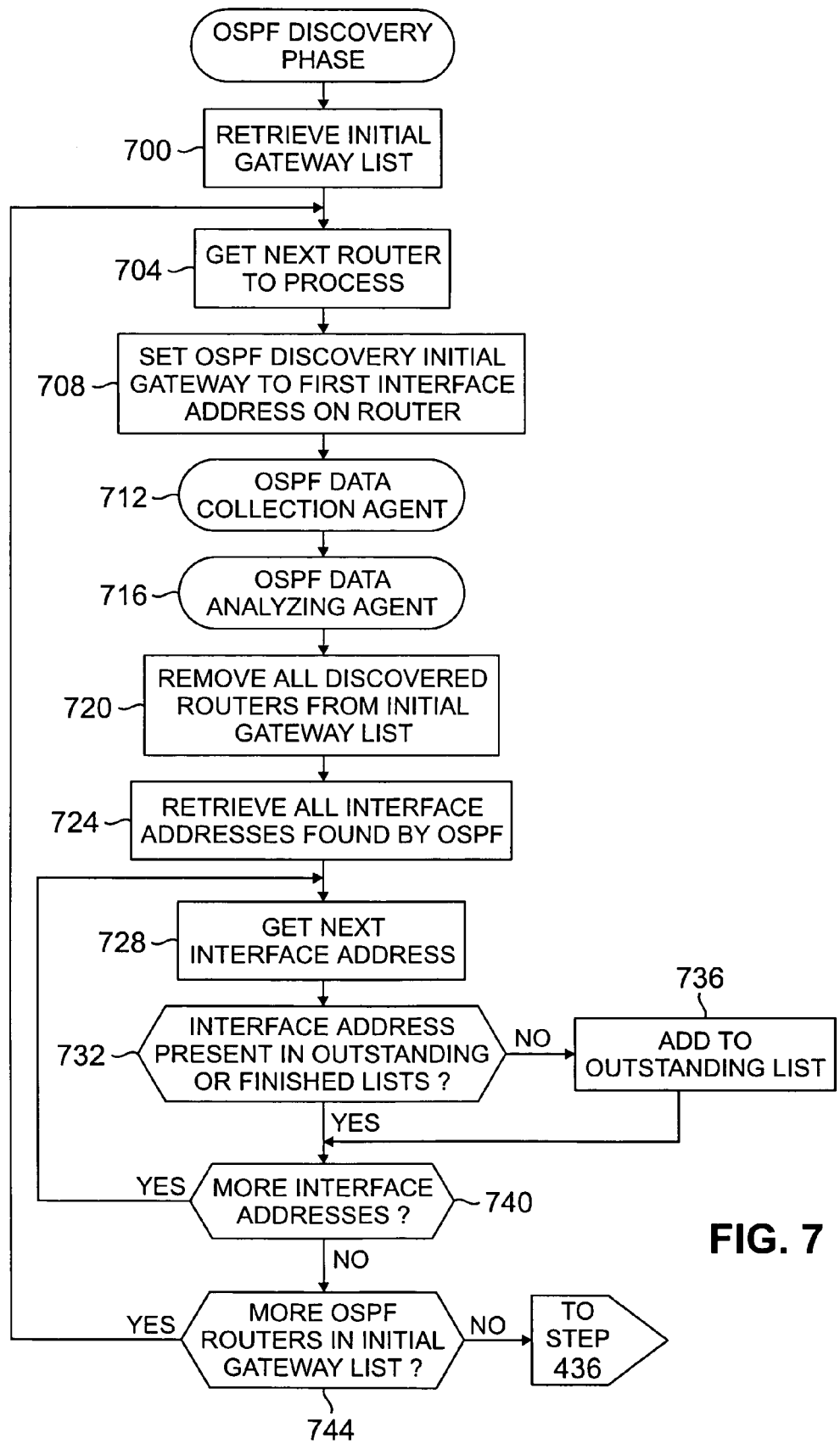
FIG. 7 is a flowchart depicting the operation of the OSPF discovery agent.

Referring to FIG. 7, the phase controller 304 in step 700 retrieves the initial gateway list 328 and gets the next router (or the first interface address attached to the router) on the list 328 in step 704 to process in OSPF discovery. The phase controller then sets the OSPF discovery initial gateway to the first interface address in step 708 and creates the OSPF data collection agent 312 in step 712 and then the OSPF data analyzing agent 316 in step 716. The operation of the data collection agent 312 and data analyzing agent 316 are described in U.S. patent application, Ser. No. 10/127,967, filed concurrently herewith, entitled "USING LINK STATE INFORMATION TO DISCOVER IP NETWORK TOPOLOGY", to Goringe, et al., and U.S. Provisional Application Ser. No. 60/317,719, filed Sep. 6, 2001, of the same title, to Goringe, et al., each of which is incorporated herein by this reference.

As set forth in the above applications, the data collection agent 312 uses a seed interface IP address to contact a host router in a selected routing area, downloads the ospfLsdb Table in the link state database of the contacted host router, discards any link state advertisements outside the area(s) of interest, adds the IP address of each interface associated with an area border router to the area border router table, and adds any LSA's for area(s) of interest to the link state advertisement table. These steps are repeated for each area border router.

The data analyzing agent 316 traverses the link state advertisement table discarding all link state advertisements other than types 1 and 2 and, using the type 1 and 2 link state advertisements, forms the router list 344 (FIG. 14) (which contains all discovered OSPF routers in the areas of interest), the link list 348 (FIG. 15), the network list 352 (FIG. 16), and/or the interface list 356 (FIG. 17).

After the operations of the data collection and data analyzing agents 312 and 316 are completed, the phase controller 304 in step 720 removes all discovered OSPF routers from the initial gateway list 328. As will be appreciated, the data collection agent 312 can set a flag for each discovered OSPF router.

In step 724, the phase controller retrieves all router interface addresses found by the data collection and analyzing agents 312 and 316 to ascertain whether further MIB discovery phase operation is required. This determination is made to ensure consideration by the MIB discovery agent 308 of any router interface addresses that were discovered during OSPF discovery and not MIB discovery. To this end, the phase controller 304 in step 728 gets the next retrieved interface address and in step 732 determines whether the retrieved interface address is in the outstanding or finished lists 320 and 324. When the address is not in the outstanding or finished lists 320 and 324, the controller adds the address to the outstanding list in step 736. In decision diamond 740, the controller 304 then determines whether there are additional interface addresses for consideration. If so, the controller returns to step 728 and repeats the foregoing steps. If not, the controller proceeds to decision diamond 744 and determines whether there are additional OSPF routers in the initial gateway list 328. When additional OSPF routers are in the list 328, the controller returns to step 704 for further OSPF discovery phase operation. When additional routers are not in the list 328, the controller proceeds to step 436 of FIG. 4.

The various output tables and lists can be merged in several ways to form a consolidated network topology model. In an "as you go" approach, the network model is a knowledge repository. The discovery algorithms deal with the model by propositional methods, namely the algorithms inform the model what they have found out and leave it to the model to decide what to do with it. When information is received from a protocol which indicates that previously obtained information about a network or a router and the like is incomplete, the additional information is added to the model. All information is marked with which protocols provided it to assist in the identification of conflicting information. Where information from two different protocols is contradictory, the topology information from MIB2 routing tables is preferred. The information is marked as contradicted by the pertinent routing protocol and the routing protocol information is retained.

A number of variations and modifications of the invention can be used. It would be possible to provide for some features of the invention without providing others.

For example in one alternative embodiment, the algorithm is used for a protocol other than OSPF, for non-SNMP network management protocols such as the Common Management Information Protocol or CMIP and/or for discovery techniques not relying on the access of MIB information. The algorithm can be used to discover any router supporting any distance-vector and link-state routing protocol.

In another alternative embodiment, the algorithm is used simultaneously for multiple routing protocols. FIG. 243 illustrates this embodiment. In step 2400 (when the gateway router is contacted), the system 300 detects the routing protocol in use on the target network. In some configurations, the gateway router can be using more than one routing protocol. In steps 2404, 2408 and 2412 topology discovery is performed using a different algorithm for each detected routing protocol. In FIG. 243, a different algorithm is used for each of the OSPF, RIP, and EIGRP routing protocols. The algorithms for the RIP and EIGRP will be a modified form of the algorithms discussed above, with the modifications being obvious to one of ordinary skill in the art. If more than one routing protocol is in use, there may be more than one routing topology. The network model of the present invention may not merge the differing routing topologies into a common model. In that event, each routing topology is concurrently represented in a single data structure.

In another alternative embodiment, the various discovery agents are called on a router-by-router basis depending upon what routing protocol the router supports. For example, during topology discovery an OSPF can discover a first OSPF router and an RIP agent can then be called to discover the next router which supports RIP but not OSPF.

In another alternative embodiment, the MIB and OSPF discovery phases can be performed in reverse order, namely OSPF discovery can be performed before MIB discovery.

In another alternative embodiment, the MIB and OSPF discovery phases are conducted in parallel or simultaneously.

In another embodiment, any of the software modules discussed above can be implemented, in whole or part, as an application specific integrated circuit or any other type of logic circuit.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and/or reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A topology discovery method, comprising:
    (a) contacting each router in a first set of routers, the first set of routers being part of a common autonomous system;
    (b) for each contacted router in the first set of routers, accessing a first set of managed objects and/or variables defined by a network management protocol, the first set of managed objects and/or variables comprising a listing of interface addresses corresponding to the contacted router, how each interface address is connected to a next hop interface of another router, and an interior gateway routing protocol identifier identifying an interior gateway routing protocol present on each link between an interface of the contacted router and the corresponding next hop interface;
    (c) for each contacted router in the first set of routers, processing the first set of managed objects and/or variables to identify each next hop interface and, for each next hop interface, how the corresponding interface of the contacted router is connected to the selected next hop interface and an interior gateway routing protocol identifier identifying an interior gateway routing protocol present on each link between the corresponding interface of the contacted router and the selected next hop interface;
    (d) based on the first set of managed objects and/or variables, determining a second set of routers using a first interior gateway routing protocol, the second set of routers being in the autonomous system;
    (e) contacting each router in the second set of routers;
    (f) for each contacted router in the second set of routers, accessing a second set of objects and/or variables defined by the first interior gateway routing protocol, the second set of managed objects and/or variables comprising a listing of interface, link, and/or network addresses corresponding to the members of the second set of routers; and
    (g) processing the first and second sets of objects and/or variables to provide a network topology model.

2. The method of claim 1, further comprising:
    (h) based on the first set of managed objects and/or variables, determining a third set of routers using a second interior gateway routing protocol different from the first interior gateway routing protocol, the third set of routers being in the autonomous system;
    (i) contacting each router in the third set of routers; and
    (j) for each contacted router in the third set of routers, accessing a third set of objects and/or variables defined by the second interior gateway routing protocol, the third set of managed objects and/or variables comprising a listing of interface, link, and/or network addresses corresponding to the members of the third set of routers, wherein in step (g) the first, second, and third sets of objects and/or variables are processed to provide the network topology model.

3. The method of claim 1, wherein the memberships of the first and second routers are different.

4. The method of claim 1, wherein the network management protocol is one of the Simple Network Management Protocol, CDP, and the Common Management Information Protocol and the first interior gateway routing protocol is one of Open Shortest Path First protocol, RIP, RIP-2, IS-IS of OSI, EIGRP, and Netware's Link Service's Protocol.

5. The method of claim 2, wherein the first and second interior gateway protocols are selected from the group consisting of Open Shortest Path First protocol, RIP, RIP-2, IS-IS of OSI, EIGRP, and Netware's Link Service's Protocol.

6. The method of claim 2, wherein the second set of routers is in a first protocol area, wherein the first protocol area uses the first interior gateway routing protocol, wherein the third set of routers are in a second protocol area, and wherein the second protocol area uses the second interior gateway routing protocol.

7. A topology discovery system, comprising:
    (a) a first topology discovery agent operable to:
        (i) contact each router in a first set of routers, the first set of routers being part of an autonomous system;
        (ii) for each contacted router in the first set of routers, access a first set of managed objects and/or variables defined by a network management protocol, the first set of managed objects and/or variables comprising a listing of interface addresses corresponding to the contacted router, how each interface address is connected to a next hop interface of another router, and an interior gateway routing protocol identifier identifying an interior gateway routing protocol present on each link between an interface of the contacted router and the corresponding next hop interface;

(iii) for each contacted router in the first set of routers, process the first set of managed objects and/or variables to identify each next hop interface and, for each next hop interface, how the corresponding interface of the contacted router is connected to the selected next hop interface and an interior gateway routing protocol identifier identifying an interior gateway routing protocol present on each link between the corresponding interface of the contacted router and the selected next hop interface;

(b) a second topology discovery agent operable to:
(i) determine a second set of routers using a first interior gateway routing protocol, the second set of routers being part of the autonomous system;
(ii) contact each router in a second set of routers;
(iii) for each contacted router in the second set of routers, accessing a second set of objects and/or variables defined by the first interior gateway routing protocol, the second set of managed objects and/or variables comprising a listing of interface, link, and/or network addresses corresponding to the members of the second set of routers; and (b) a phase controller operable to:
(i) based on the first set of managed objects and/or variables, select between the first and topology discovery agents to effect topology discovery; and
(ii) process the first and second sets of objects and/or variables to provide a network topology model.

8. The system of claim 7, further comprising:
(c) a third topology discovery agent operable to:
(i) based on the first set of managed objects and/or variables, determine a third set of routers using a second interior gateway routing protocol different from the first interior gateway routing protocol, the third set of routers being part of the autonomous system;
(ii) contact each router in the third set of routers; and
(iii) for each contacted router in the third set of routers, access a third set of objects and/or variables defined by the second interior gateway routing protocol, the third set of managed objects and/or variables comprising a listing of interface, link, and/or network addresses corresponding to the members of the third set of routers and wherein the phase controller is operable to process the first, second, and third sets of objects and/or variables are processed to provide the network topology model.

9. The system of claim 7, wherein the memberships of the first and second routers are different.

10. The system of claim 7, wherein the network management protocol is one of the Simple Network Management Protocol, CDP, and the Common Management Information Protocol and the first routing protocol is one of Open Shortest Path First protocol, RIP, RIP-2, IS-IS of OSI, EIGRP, and Netware's Link Service's Protocol.

11. The system of claim 8, wherein the first and second interior gateway protocols are selected from the group consisting of Open Shortest Path First protocol, RIP, RIP-2, IS-IS of OSI, EIGRP, and Netware's Link Service's Protocol.

12. The method of claim 8, wherein the second set of routers is in a first protocol area, wherein the first protocol area uses the first interior gateway routing protocol, wherein the third set of routers are in a second protocol area, and wherein the second protocol area uses the second interior gateway routing protocol.

13. The method of claim 1, wherein the accessing step (b) comprises: accessing the first set of managed objects and/or variables contained in the ipAddr table, ipAddrTable table, ipRouteTable table, and ipRouteEntry table.

14. The method of claim 1, wherein in processing step (c) when a packet can pass directly from the contacted router interface to the network, the network is assumed to be a stub network and when a packet must pass from the contacted interface through a network to reach another network, the intermediate network is assumed to be a transport network.

15. The method of claim 1, wherein step (c) produces, for each router in the first set of routers a first set of interface addresses, wherein step (f) produces, for each in the second set of routers, a second set of interface addresses, wherein a plurality of routers are in both the first and second sets of routers, and further comprising:
comparing the first and second lists of interface addresses to identify, for each router in the first and second sets of routers, duplicative and conflicting addresses;
removing duplicative addresses from a composite list of interface addresses; and
for conflicting addresses, use the corresponding addresses in the first list of addresses.

16. The system of claim 7, wherein the accessing operation (ii) comprises:
accessing the first set of managed objects and/or variables contained in the ipAddr table, ipAddrTable table, ipRouteTable table, and ipRouteEntry table.

17. The system of claim 7, wherein in processing operation (iii) when a packet can pass directly from the contacted router interface to the network, the network is assumed to be a stub network and when a packet must pass from the contacted interface through a network to reach another network, the intermediate network is assumed to be a transport network.

* * * * *

UNITED STATES PATENT AND TRADEMARK OFFICE
CERTIFICATE OF CORRECTION

PATENT NO. : 7,069,343 B2
APPLICATION NO. : 10/127888
DATED : June 27, 2006
INVENTOR(S) : Goringe et al.

Page 1 of 1

It is certified that error appears in the above-identified patent and that said Letters Patent is hereby corrected as shown below:

Column 16, Line 12, in Claim 12, replace "The method of claim 8" with --The system of claim 8.--

Signed and Sealed this

Thirty-first Day of July, 2007

JON W. DUDAS
*Director of the United States Patent and Trademark Office*